United States Patent [19]
Barbier et al.

[11] 3,791,035
[45] Feb. 12, 1974

[54] INSTALLATION FOR PRODUCTION OF SOFT AND WASHED-CURD CHEESES

[75] Inventors: Jean-Pierre Barbier; Jean-Pierre Feugnet, both of Retiers, France

[73] Assignee: Laiteries E. Bridel, Retiers, France

[22] Filed: Oct. 21, 1971

[21] Appl. No.: 191,502

Related U.S. Application Data

[62] Division of Ser. No. 874,488, Nov. 6, 1969, Pat. No. 3,756,238.

[52] U.S. Cl. ................................................. 31/46
[51] Int. Cl. ............................................. A01j 25/06
[58] Field of Search ...... 31/30, 25, 49; 83/700, 620, 83/504, 498, 499

[56] References Cited
UNITED STATES PATENTS

| | | | |
|---|---|---|---|
| 537,226 | 4/1895 | Ohl ........................................ | 31/49 |
| 2,884,694 | 5/1959 | Hannon et al. .......................... | 31/30 |
| 3,142,905 | 8/1964 | Strasbaugh .............................. | 31/24 |
| 2,439,840 | 4/1948 | Buroff .................................... | 31/30 |

*Primary Examiner*—Hugh R. Chamblee

[57] ABSTRACT

Installation for production of soft and washed-curd cheeses, including a device for molding washed-curd, consisting of giant molds, each having the section of the final cheese product and capacity corresponding to a multiple of the final cheese volume, said molds being grouped in units; a drainer device including means for turning over the mold units by imparting to them a tilting motion, followed by a pendular one, to drive out the serum; and a device for cutting the molded curd taken out of the mold into slices to the final dimensions of the cheeses, including a cutting device equipped with means to adjust knife spacing in function of the length of the molded curd in order to obtain equal curd parts regardless of the length of molded curd.

1 Claim, 8 Drawing Figures

Patented Feb. 12, 1974
3,791,035
3 Sheets-Sheet 1
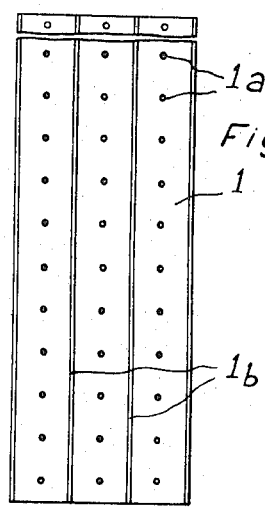
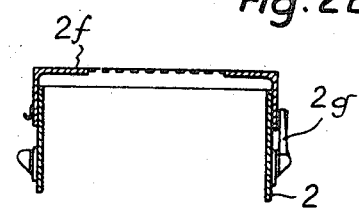
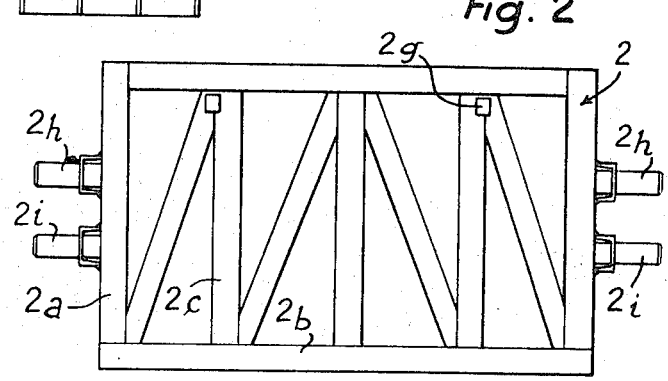
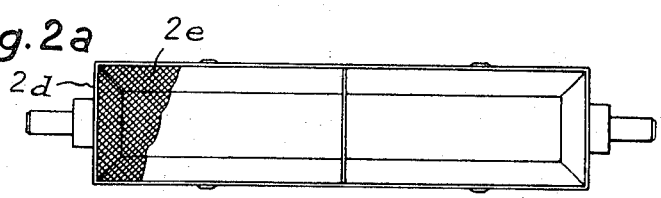

INSTALLATION FOR PRODUCTION OF SOFT AND WASHED-CURD CHEESES

This application is a division of application Ser. No. 874,488, filed Nov. 6, 1969, now U.S. Pat. No. 3,756,238.

The present invention concerns a new installation for producing soft and washed-curd cheeses.

Until now, such production consisted of the following operations, performed in pans : turning milk into rennet, curd slicing, serum extraction, washing of curd with water. The washed-curd is then placed into individual molds and subjected to the usual operations of salting, ripening and packing.

Due to recent technological developments, the curd can now be washed advantageously in large-capacity tanks and no longer in pans, but this excludes any possibility of adjusting cheese weight differences by weighing, since, at the time of molding, there exists a heteregenous mixture of curd and water. This also requires molding the whole tank content of washed curd at the same time. The use of a battery of individual molds is impracticable because of the enormous overall dimensions of such a battery and the large labor force required for its handling.

The present invention permits these difficulties to be surmounted thanks to the use of giant molds grouped in units, in order to from, after molding and draining, molded curds that are then cut into slices to the final dimensions of the cheeses.

The installation for producing soft and washed-curd cheeses, according to the present invention, includes for this purpose :

a. a station for molding the washed-curd in giant molds, each having a capacity corresponding to a multiple of the final cheese volume, grouped into units;

b. a draining station for turning over the unit molds and ejecting the serum; and c. a station for cutting the molded curd taken out of the molds into slices to the final dimensions of the cheeses.

According to the first characteristic, the giant molds are of basically prismatic shape, open at both ends, their walls equipped with perforations for draining the serum and with visible ribs to maintain a certain spacing between the adjacent walls of the molds when they are arranged side by side, thus permitting the serum to flow out.

According to another characteristic, the molds are housed side by side in a container equipped with a perforated bottom and with a movable perforated cover, said container supporting, in addition, on each of its 2 opposite lateral faces a pair of turnover lugs located on either side of the container median axis; the molds are supplied with washed curd by means of a distribution plate with drilled holes, each hole opening into a mold.

According to still another characteristic, the drainage station for turning over the closed containers, in order to facilitate serum exudation, includes a frame along the uprights of which slides a movable device driven by a motor reducer via a lift screw; said movable device supports, on the one hand, the U-shaped half-bearings supporting the lower lugs of the container and, on the other hand, another pivot-mounted U-shaped half-bearing for the temporary support of the upper container lug; this part is made to pivot by a cam which, at the limit of movable device rise, driven by a finger, causes said half-bearing to pivot about its axis and free the upper lug of the container, which then tilts and turns over.

According to still another characteristic, the station for slicing molded curd includes a) a movable cutting device acting in the vertical plane, b) a sliding table for positioning the molded curd under the knives and for its ejection after slicing and c) a system for adjusting knife spacing in function of the length of molded curd to be sliced; said system includes a keyed shaft supported by the movable device and driven by a motor reducer both in forward and reverse motion, said shaft driving by means of its key, a spacing system of threaded rings and nuts integral with the knife holder on which the knives and unclamping devices are mounted.

The invention will be described in the following pages with references to the appended sketch on which :

FIG. 1 is elevation view of a mold according to the invention

FIG. 2 is elevation view of the container; FIG. 2a, plan view of said container and FIG. 2b a detail of this container;

Figure 3:
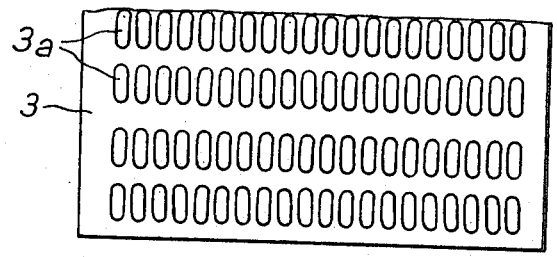
FIG. 3 is a view of the curd distribution plate

As mentioned above, the installation according to the invention includes a molding station, a drainage station and a slicing station.

MOLDING STATION

The washed-curd molding station includes giant molts 1 (FIG. 1) made, for instance, out of polyethylene or another suitable material and having a capacity corresponding to a multiple of the final cheese volume. Each mold is of parallelopipedal shape, open at both ends, its walls equipped with perforations 1a for draining the serum and with longitudinal ribs 1b to maintain a certain spacing between adjacent mold walls when they are arranged side by side, thus permitting the serum to flow out.

As non-limitative example, each mold has a capacity corresponding to 10 cheeses and, for this purpose, it has the same section as the final cheese but a height equal to ten times the said cheese.

These giant molds are housed side by side in containers (2) (FIG. 2,2a, 2b), each consisting of a parallelepipedal metal frame with uprights 2a, longitudinal members 2b, braces 2c, cross members 2d, perforated bottom 2e and an equally perforated movable cover 2f for serum flow. Between the bottom of the container and the molds and between the cover and the molds are interposed cheese-diary blinds to retain the curd. The cover is locked in place by a bolt 2g. In addition, each of the 2 side faces of the container is provided with a pair of turnover lugs 2h and 2i, located on either side of the container median axis.

As a non-limitative example, each container can hold forty or so molds aligned on two rows.

In operation, with the molds arranged side by side in the containers and their covers removed, the containers are placed side by side in a number corresponding to the quantity of curd to be molded; they are covered with a curd distribution plate 3 (FIG. 3), composed of a metal plate drilled with oblong holes 3a, each one opening into a mold, and the curd contained in the washing tank is delivered on this curd distributor by a suction pump. A blind is placed on the molds filled with curd and the covers are replaced.

DRAINING STATION

Figure 4:
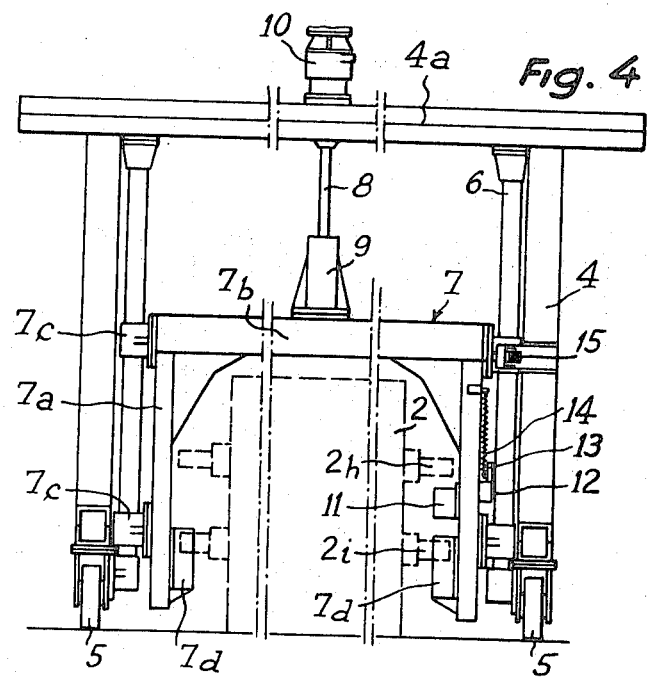
FIG. 4 is elevation view of the container turnover frame

The closed containers must be turned upside down to facilitate serum exudation and, for that purpose, considering the weight of the container and of its contents of molds and of curd, the draining station according to the invention includes a turnover portal frame 4 (FIG. 4) mounted on rollers 5. To this portal frame are fastened two vertical bars 6 forming a slideway on which slides a mobile device 7 consisting of uprights 7a fastened to a horizontal beam 7a, said movable device being driven by a lift screw 8 of which the sheath 9 is integral with the beam 7b; this screw is itself actuated by a motor reducer 10 mounted on the horizontal beam 4a of portal frame 4.

The uprights 7a of the movable device have, in addition, fixed U-shaped half bearings 7d intended to support the lower lugs 2i of the container and another U-shaped half bearing 11, pivot-mounted about a shaft 12 and forming a temporary support for the upper lug 2h of the container. This part is made to pivot by a cam 13 integral with said shaft 12; on the one hand, this cam is stressed by springs 14 which return it constantly into the lowered position of half bearing 11; on the other hand, it may be driven, at the limit of movable device rise, by a finger 15 supported by a portal frame 4; said finger bearing against the cam causes it to pivot about its axis, as well as its half bearing 11 which is integral with it.

In operation, with the containers 2 placed side by side, the portal frame is brought above the first container and the motor reducer 10 is put into operation. The screw 8, when rotating, makes the movable device 7 slide from the bottom up. During this rise, the lower and upper lugs 2h, 2i engage in the half bearings 7d and 11, and the container is raised under the portal frame; at the end of the rise, finger 15 drives cam 13 and causes the upper half bearing 11 to pivot. The latter frees the upper lug 2 of the container during its retraction. The container tilts and turns over. This turning-over motion is continued by a series of pendular motions, creating a centrifugal force hastening curd drying. Then the upside-down container is lowered and the following container is turned over.

CUTTING STATION

After draining, the molds are taken out of the container, the molded curd is taken out of the molds and is cut in slices to the dimensions of the final cheese product, the heights of the molded curd varying from one mold to another.

The cutting station is therefore equipped with a cutter provided with a special system intended to take up the length differences of molded curd and to cut each molded curd into equal parts regardless of its length.

Figure 5:
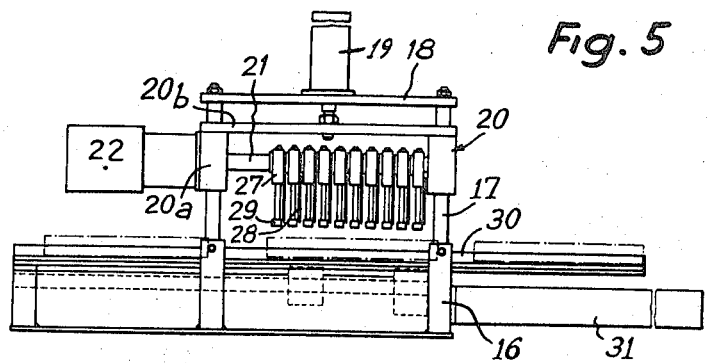
FIG. 5 is elevation view of the slicer and FIG. 5a a detail view of the knife spacing system.
Figure 5A:
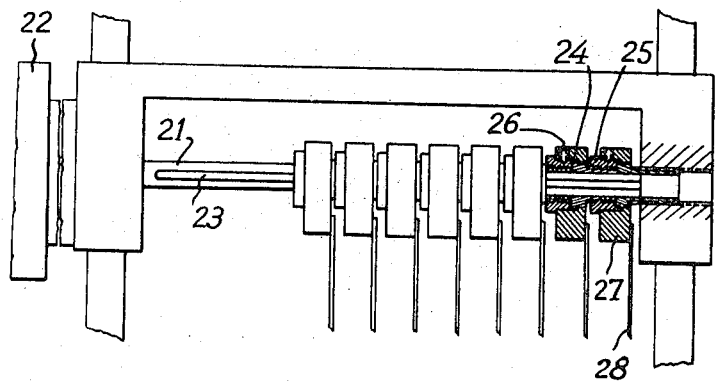

For this purpose, the cutter includes a frame 16 (FIGS. 5 and 5a) supporting four vertical uprights 17 surmounted by a plate 18 serving as support for cylinder 19.

On the uprights 17 slides a movable cutting device 20 driven by said cylinder 19 and consisting of two pairs of slide rings 20a integral with an upper crosspiece 20b on which the cylinder piston rod acts; this device supports a keyed divider shaft 21 driven by a forward-reverse motor reducer 22, said shaft driving, by means of its key 23, a spacing system with threaded rings 24 and nuts 25 made integral by screws 26 with the knife holders 27 on which are mounted the knives 28 and the unclampers 29. Slideways (not shown) are provided to guide the knife holders during their axial translation motion and to prevent them from turning. The pitch of nuts 25 and rings 24 being identical, the knife spacing is thus constantly equal and the parts cut out from the same molded curd are also equal.

The molded curd to be cut up is brought under the knives on a sliding table 30 driven by a cylinder 31.

In operation, the molded curd to be cut is placed under the knives, action is exerted on motor reducer 22 to bring the last knife (to the left of the sketch) to the limit of the molded curd and cylinder 19 is actuated to lower the movable device 20 and the knives 28 in order to cut the molded curd into equal parts.

The rise of the movable device 20 puts into motion cylinder 31, which ensures, by a single reciprocal motion of table 30, simultaneous ejection of the cut-up molded curd and the placing of a new molded curd under the knives.

The cut-up curd is then subjected to the conventional operations of salting, ripening and packing.

We claim:

1. Apparatus for cutting cheese products and the like comprising means for supporting at a cutting station the product to be cut, a plurality of knife elements supported in spaced-apart relation along a path of alignment overlying the cutting station, means for adjusting the spacing of said knife elements, and means for moving said knife elements in unison toward the cutting station to cut the product, said apparatus being further characterized by a frame element, a shaft rotatably mounted relatively said frame element, a plurality of spaced screw elements mounted on said shaft, said screw elements being mounted for rotation with said shaft and for longitudinal sliding movement relative to said shaft, a plurality of spaced nut elements mounted for longitudinal sliding movement relative to said shaft, each of said nut elements mounting a knife, means defining an operable connection between pairs of screw elements and nut elements such that each pair of screw and nut elements are longitudinally translatable along said shaft, whereby rotation of said shaft varies the longitudinal spacing between said nut elements and the knives associated therewith.

* * * * *